Figure 1:
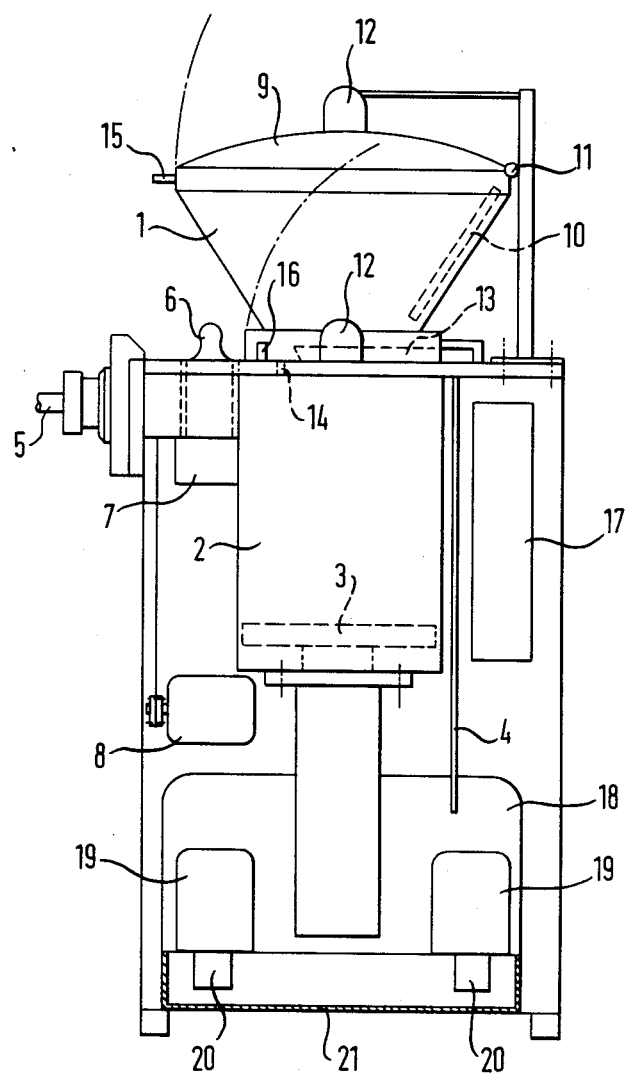

United States Patent [19]

Frey

[11] Patent Number: 4,617,701
[45] Date of Patent: Oct. 21, 1986

[54] METHOD OF DISPENSING A DEFORMABLE AND FLOWABLE FILLING MATERIAL

[75] Inventor: Albert Frey, Herbrechtingen, Fed. Rep. of Germany

[73] Assignee: Firma Heinrich Frey, Herbrechtingen, Fed. Rep. of Germany

[21] Appl. No.: 613,909

[22] Filed: May 24, 1984

[30] Foreign Application Priority Data

May 26, 1983 [DE] Fed. Rep. of Germany ....... 3319139
Feb. 23, 1984 [DE] Fed. Rep. of Germany ....... 3406605

[51] Int. Cl.⁴ .............................................. A22C 11/06
[52] U.S. Cl. .............................................. 17/45; 17/39
[58] Field of Search ................... 17/35, 38, 39, 45, 49; 222/372, 373

[56] References Cited

U.S. PATENT DOCUMENTS

| | | | |
|---|---|---|---|
| 3,034,171 | 5/1962 | Rosenthaler | 17/35 |
| 3,108,319 | 10/1963 | Thompson . | |
| 3,161,910 | 12/1964 | Hughes | 17/39 |
| 3,166,786 | 1/1965 | Thompson . | |
| 3,189,940 | 6/1965 | Hughes | 17/39 |
| 3,334,674 | 8/1967 | Hughes . | |
| 3,537,129 | 11/1970 | Orloff et al. | 17/35 |
| 3,601,845 | 8/1971 | Mavrich | 17/38 |
| 3,733,653 | 5/1973 | Javaloy et al. | 17/35 |

FOREIGN PATENT DOCUMENTS

| | | | |
|---|---|---|---|
| 1289760 | 2/1969 | Fed. Rep. of Germany | 17/38 |
| 1222221 | 1/1960 | France | 17/38 |
| 1350069 | 12/1963 | France . | |
| 2274223 | 1/1976 | France . | |
| 862285 | 3/1961 | United Kingdom . | |

Primary Examiner—Willie G. Abercrombie

[57] ABSTRACT

A method of dispensing pasty material, in particular sausage meat, is described in which the filled material is first introduced into a filling funnel, is preferably deaerated, and is subsequently transferred into a filling cylinder, with the transfer being effected as a result of the pressure difference which prevails between the filling funnel and the filling cylinder. The dispensing of the filling material takes place in the customary manner by pressure applied to a filling piston provided in the filling cylinder.

8 Claims, 2 Drawing Figures

METHOD OF DISPENSING A DEFORMABLE AND FLOWABLE FILLING MATERIAL

The invention relates to a method of dispensing a deformable and flowable filling material, in particular sausage meat, wherein the filling material is first introduced into a filling funnel, wherein the filling material is then transferred into a filling cylinder at a reduced pressure, wherein the connection between the funnel and the inner chamber of the cylinder is then interrupted, and wherein the filling material is then set under pressure by reducing the size of the inner cylinder and is expelled in defined manner via a dispensing tube. Furthermore, the invention is directed to an apparatus for carrying out this method.

In dispensing machines for filling containers, tubes, sausage skins (including gut skins) and the like with pasty material use is normally made of a cylinder intended to receive a supply of the material in question. The content of the cylinder is dispensed by means of a hydraulically moved pressing or filling piston,portion by portion,via a dispensing tube or is pressed into a specified receiving volume. A machine of this kind is for example known from German Auslegeschrift No. 12 96 076.

Such dispensing machines have to be discontinuously charged so that,on the one hand,disturbing shortfalls in output have in many cases to be tolerated and, on the other hand, care must be taken that the filling cylinder is charged as far as possible in a way such that it is free of air bubbles, because inclusions can lead to a deterioration of the quality of the material to be dispensed and are therefore very undesirable.

Continuously operating dispensing machines are also already known in which the filling material is supplied to the dispensing tube by means of conveyor screws, vane impellers and the like.

The prime disadvantages of these continuously operating machines are a relatively large susceptibility to wear and breakdown, the inherent danger of accidents and in particular the unavoidable occurrence of the so-called smearing effect which means that the lean particles are smeared with fat during the transport of the filling material,so that the dispensed product has a non-differentiated appearance which gives the false appearance of an undesirably high fat content. The wear which occurs is particularly serious because in practice only one or two readjustments are possible as a rule, and the worn parts then have to be exchanged which leads to notable costs. Finally, the de-aeration of the filling material in the known continously operating dispensing machines leaves something to be desired, particularly with material which is difficult to de-aerate.

The principal object underlying the present invention is to develop a method of the initially named kind so that a high output performance is obtained with practically wear-free operation and so that the dispensing of diverse compositions is possible with optimum de-aeration and without the danger of smearing. Furthermore, apparatus intended to carry out this method should be of extremely simple construction and capable of being operated without problems. These objects are satisfied by the invention in that the transfer of the filling material from the filling funnel into the filling cylinder is effected by a predeterminable pressure difference between the chamber of the filling funnel and the chamber of the filling cylinder, wherein, in particular at the start of the transfer process a predeterminable reduced pressure is provided in the chamber of the filling funnel and the filling material is stirred while the reduced pressure prevails in the chamber of the filling funnel.

In this way it is already possible to ensure the most extensive removal of surface air and interstitial air in the filling funnel. By selecting a defined pressure difference between the chamber of the filling funnel and the chamber of the filling cylinder,and by exploiting this pressure difference to transport the already initially de-aerated filling material into the filling cylinder the transfer of the filling material into the filling cylinder takes place rapidly but nevertheless very carefully. At the moment the filling material enters into the chamber of the filling cylinder, which is at a lower pressure than the chamber of the filling funnel, the filling material is split up again, almost explosively, so that the remaining interstitial air becomes free and is at once extracted. As the filling process takes place in a very short time and practically during the time interval which is necessary to place a sausage skin on the dispensing tube it is possible to ensure almost continuous operation despite the lack of a recirculating conveyor device.

The turning over or stirring process in the filling funnel is preferably carried out in such a way that the filling material is moved or conveyed in the direction towards the outlet of the filling funnel while its ability to flow is made more uniform. In this way the occurrence of a throughhole, which would prevent the transport of the filling material, is avoided and the pressure difference is maintained. As a result the desired rapid and reliable transport of the entire filling material into the filling cylinder is ensured.

A preferred apparatus for carrying out the method of the invention comprises a filling funnel, a filling cylinder communicating with the outlet of the filling funnel, a closure device provided between the filling funnel and the filling cylinder, at least one filling cylinder expulsion opening,and a filling piston which executes strokes each corresponding to the quantity of filling material to be expelled in dependence on the controllable application of pressure, and the special feature of this apparatus lies in the fact that the filling funnel is provided with a closure member which consists in particular of an upwardly pivotable and/or removable cover which ensures an at least substantially air-tight closure of the filling funnel. The closure member could however also be formed by some other closure unit, for example by a foil or the like.

The filling funnel and the filling cylinder are preferably provided with a connection to a source of reduced pressure and in particular also provided with a vacuum regulating valve which makes it possible to adjust,without problem, the pressure difference which brings about the transport of the filling material.

A stirrer provided in the filling funnel is preferably constructed in such a way that the consistency and flowability of the composition is made more uniform,and so that a wall scraping effect occurs during the stirring process,which has the consequence of extensive self-cleaning of the filling funnel.

The closure device between the filling funnel and the filling cylinder preferably consists of a slider which can move in a straight line and which can withstand the forces originating from the pressure difference without problem.

The vacuum can be controlled via a valve, and can also be controlled in dependence on the ratio of the filling content to mass, which automatically results in the control of the speed of transfer of the filling material.

The use of a sensor controlled vacuum valve mounted in the closure lid of the filling cylinder ensures that both the vacuum created during the charging phase by withdrawal of the piston and the additional externally applied vacuum are effective so that the material is rapidly accelerated in the direction of the base of the filling cylinder and so that the material is broken up on transfer into the filling cylinder which ensures that included air bubbles become free and that the air can be drawn off. If the piston is loaded in the direction of expulsion then the filling material comes into contact with the sensor which then brings about the withdrawal of the vacuum valve from the inner chamber of the filling cylinder whereby the external vacuum source is also separated from the inner chamber of the filling cylinder. A vacuum connection provided at the base of the filling cylinder facilitates the retraction of the piston, and thus contributes in ensuring that this piston can be simply and rapidly drawn downwardly with little effort.

Figure 2:
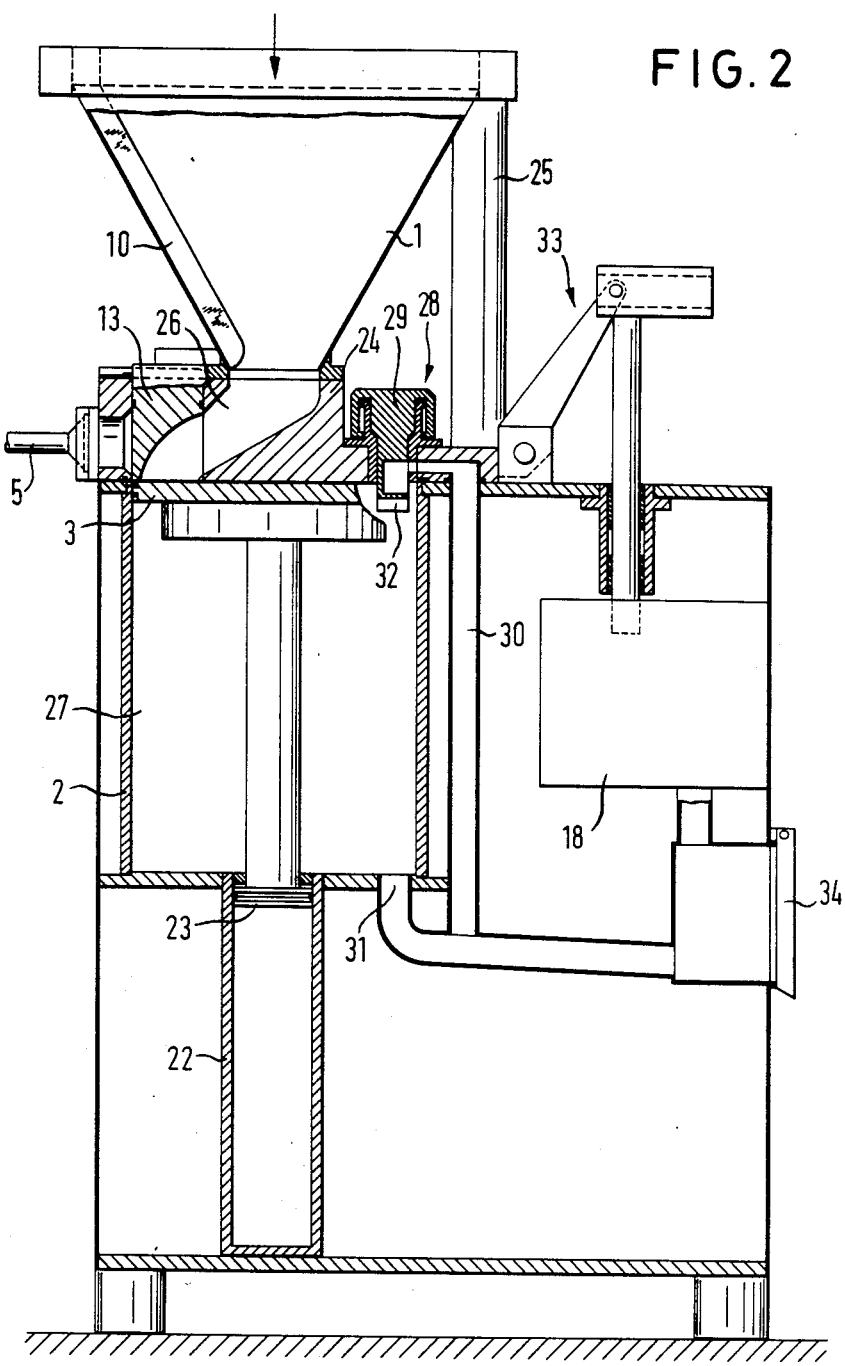

The invention will be described in more detail in the following with reference to embodiments as illustrated in the accompanying drawings which show:

FIG. 1 a schematic illustration of a vacuum filling machine in accordance with the invention, and FIG. 2 a partially sectioned side view of a further embodiment of a filling machine in accordance with the invention.

The vacuum filling machine shown in FIG. 1 embraces a filling funnel 1 and a filling cylinder 2 arranged in a suitable frame construction beneath the filling funnel. The filling cylinder 2 is connected with the filling funnel 1 via a passage which can be closed by means of a slider 13.

The filling funnel 1 and the filling cylinder 2 are coaxially arranged and the passage opening is preferably centrally disposed.

A piston 3 is arranged in the filling cylinder 2. The piston 3 executes strokes, responding in each case to the quantity to be expelled in dependence on a controllably applied pressure. Moreover, the lowering or retraction movement of this piston 3 can be used to generate a vacuum in the chamber of the filling cylinder.

The movement of the piston 3 during the expulsion process is preferably detected by a measuring unit 4 consisting of a measuring rod and is used for control purposes.

The inner chamber of the filling cylinder 2 communicates with a dispensing tube outlet 5 via a proportioning stopcock or valve 6 and a slider 7. A turn-off motor 8 is provided in the customary manner and is schematically illustrated.

A controllable stirrer 10 with a scraper is provided in the filling funnel 1. Surface air and interstitial air is removed from the filling material in question through this stirrer which can be set running at the start of the de-aeration process. The scraper or doctor blade belonging to the stirrer always transports the filling material towards the center of the funnel and ensures a clean wall which in turn greatly simplifies the cleaning procedure and represents a substantial advantage in comparison to the complicated stirrers of continuously operating machines.

The filling funnel 1 is closable in an at least essentially air-tight manner by means of a pivotally attached lid 9, whereby a desired pressure difference between the chamber of the filling funnel and the chamber of the filling cylinder can be created. A safety switch 11 is provided in the transition region between the funnel and the cover and vacuum sight glasses 12 are also provided in the funnel and cylinder areas.

The respective pressures prevailing in the filling funnel 1 and in the filling cylinder 2 can be regulated for which purpose appropriate regulating valves 15 and 16 are provided.

The frame construction which accommodates the filling cylinder 2, and which also carries the filling funnel 1, also embraces an electronic unit 17 customary for such machines, a vacuum pump 18, an electric motor 19 and also an oil pump and an oil sump 21.

The filling machine which has been described operates as follows:

After filling the funnel 1 the cover 9 is closed. A vacuum is preferably provided in the filling funnel 1 after closing the cover and the level of this vacuum is selected in dependence on the filling material in question. The stirrer 10 is then set into operation, i.e. the deaeration process for substantially removing the surface air and the interstitial air starts.

The piston 3 is lowered in the filling cylinder 2 and provides a vacuum which results in the pressure difference required to transfer the filling material from the filling funnel into the cylinder results. By selecting this pressure difference the speed of transport of the filling material is fixed on its passage from the filling which to the filling cylinder.

The stirrer 10 ensures that no through-hole exists on opening the slider 13 and accordingly that a continuous, relatively rapid and complete transfer process takes place. When the filling material enters into the filling cylinder it breaks up into a spray whereby residual institial air is freed and can at once be drawn off.

After completion of the transfer of the filling material into the filling cylinder 2 the slider 13 is again closed and the piston 3 is moved upwardly in order to generate a sufficiently high pressure which prevents a suction process taking place via the filling stub. The suction is terminated and the desired initial pressure in the filling composition is selected. The dispensing process can then begin.

During the carrying out of the dispensing process,- which can take place in known manner, the filling funnel 1 can already be re-charged and the procedures of creating the reduced pressure and de-aerating the material with the running stirrer can then be carried out at once.

The possibility of adjusting the air content of the filling material in the funnel region is particularly favourable in so far as it is possible in this way to effect an adaptation to tightly compressed sausages and to less tightly compressed sausages. It is very important, that the transport of the filling material from the funnel into the filling cylinder in accordance with the invention does not produce smearing of the mass of filling material so that sausage types with high fat contents have a perfect filled appearance which can only be obtained by means of piston filling.

FIG. 2 shows a filling cylinder 2 with a pressing or filling piston 3 by means of which the filling material in question can be pressed via an expulsion opening through a dispensing tube 5.

The filling piston 3 can be displaced in the filling cylinder 2 via a piston rod which is connected with a servo-motor consisting of a servo-cylinder 22 and an actuating piston 23.

The filling cylinder 2 is closed by means of an upwardly pivotable closure wall 24. A filling funnel 1 is mounted on this closure wall and preferably fixedly connected therewith. The filling funnel 1 is preferably equipped with a conveyor and stirring mechanism 10 which is, for example, driven via a shaft 25. The base-end outlet of the filling funnel 1 is connectable with the inner chamber 27 of the filling cylinder 2 via a channel 26 formed in the closure wall 24 and via an adjoining mating passage in a slider 13. On retraction of the piston 3 from the position shown in the drawing into its lower end position a vacuum is created in the inner chamber 27 of the filling cylinder 2. On opening the slider 13 relative to the filling funnel 1 the vacuum brings about a rapid transfer of the material present in the funnel 1 into the chamber 27.

The vacuum in the chamber 27 provided by the retraction movement of the piston is supplemented and augmented by a vacuum pump 18 which becomes effective when the piston 3 has reached its lower end position. At this time a vacuum valve 28 mounted in the closure wall 24 is namely opened by axial displacement of its movable part 29 and thus connects the inner chamber 27 with the vacuum source 18 via a line 30.

This vacuum source 18 is however also in communication with the chamber disposed beneath the piston 3 via a baseend connection 31, whereby the retraction of the piston is facilitated. This connection does not however represent an absolutely essential measure.

During the rapid transfer of the material in question from the filling funnel 1 into the inner chamber 27 of the filling cylinder, which is brought about by the action of the vacuum, the material is split up on entry into the filling cylinder 2, whereby air bubbles included in the material are freed and the freed air can be drawn off via the vacuum valve 28. The air inclusions which are in practice extremely disturbing are reliably removed in this manner.

When, after changing over the slider 13, which is preferably constructed as a rotatable valve, the piston 3 is moved in the upward direction the filling material reaches a sensor 32 arranged at the lower side of the movable valve part 29. The sensor 32 then at once brings about a retraction of the valve part 29 from the inner chamber 27 of the filling cylinder 2 via a valve control unit 33, and indeed in such a way that at the end of this movement the sensor 32 lies flush in the closure wall 24 so that no contamination of the vacuum valve 28 can occur.

A flap 34 which contacts a sealing rubber closes an opening of the vacuum system which leads to the atmosphere.

It has already been pointed out that with the apparatus of the invention the filling material can be dispensed practically without smearing because, in contrast to continuously, operating machines, the transport and guide passages are extremely short. In this way an excellent appearance of the sausage is achieved even for coarse sausage meat. The areas of the machine through which the material flows, in particular the slider 13 and the dispensing tube 5 can be internally coated with a special low friction material, in particular silicone, which is likewise advantageous in practice.

I claim:

1. In a method of dispensing a deformable and flowable filling material, in particular sausage meat, wherein the filling material is first introduced into a filling funnel, and the filling material is then transferred into a filling cylinder at a reduced pressure, and the connection between the funnel and the inner chamber of the cylinder is then interrupted, and wherein the filling material is then exposed to increased pressure by reducing the size of a dispensing cylinder and is expelled in defined manner via a dispensing tube, the improvement wherein the transfer of the filling material from the filling funnel into the filling cylinder is effected by a predetermined pressure difference between the chamber of the filling funnel and the chamber of the filling cylinder and wherein prior to said transfer a predetermined reduced pressure is provided in the chamber of the filling funnel and the filling material is transferred while reduced pressure prevails in the chamber of the filling funnel during stirring thereof to move the filling material towards the center of the filling funnel during the transfer of the filling material from the filling funnel into the filling cylinder.

2. A method in accordance with claim 1, wherein the charging of the filling funnel and the generation of reduced pressure in the chamber of the filling funnel takes place during a period when the filling material is being expelled from said filling cylinder through a dispensing tube.

3. Apparatus for dispensing a deformable and flowable material such as sausage meat and the like, the apparatus comprising a filling funnel for receiving the material, said filling funnel having a broad end, a narrow end and generally conical wall defining an internal space; a filling cylinder disposed beneath said filling funnel; a movable wall scraper disposed in said filling funnel for scraping said material from said wall of said filling funnel; a valve element disposed between said narrow end of said filling funnel and said filling cylinder, said valve element being movable between a closed position in which it blocks communication between said filling funnel and said filling cylinder and an open position in which it provides a passage of communication between said filling funnel and said filling cylinder; a cover member for closing said broad end of said filling funnel; a piston disposed for axial movement within said filling cylinder between a first position adjacent said valve element and a second position adjacemt a base end of said filling cylinder; a vacuum connection communicating with said internal space of said filling funnel for generating a partial vacuum therein; means for generating a partial vacuum in said filling cylinder, said partial vacuum in said filling cylinder defining a reduced pressure relative to said partial vacuum in said filling funnel, whereby to cause movement of said material from said filling funnel into said filling cylinder through said passage when said valve element is in said open position and said piston is in said second position, with simultaneous removal interstitial air from said material, and wherein said wall scraper is effective to prevent development of a hole in said material during said movement of said material into said filling cylinder; a closable discharge outlet for discharging said material from said filling cylinder, said discharge outlet being disposed in the region of said valve element; and pressure means for moving said piston from said second position to said first position when said valve element is in said closed position to expel said material through said discharge outlet.

4. Appartus in accordance with claim 3, wherein said piston in said filling cylinder, upon depression thereof, generates a partial vacuum in said filling cylinder.

5. Apparatus in accordance with claim 3 wherein the closure device between said filling funnel and said filling cylinder is constructed as a slider which is guided for straightline movement.

6. Apparatus in accordance with claim 3 wherein the inner chamber of said filling cylinder is connected via a sensor controlled valve to a vacuum source, said senor responding on contact with the filling material to control the vacuum valve and bring about the withdrawal of the movable part of the vacuum valve from the inner chamber of the filling cylinder; and the sensor controlled vacuum valve is mounted in the closure wall of the filling cylinder.

7. Apparatus in accordance with claim 3, wherein the slider is constructed as a rotatable slider having a first position in which it frees the expulsion opening leading to said discharge outlet and blocks the connection between the filling funnel and e filling cylinder, and a second position, in which it closes the expulsion opening leading to said discharge outlet and frees the connection between the filling funnel and the inner chamber of the filling cylinder.

8. Apparatus according to claim 7, wherein said slider and said discharge outlet are provided with an internal coating of silicone.

* * * * *